(12) United States Patent
Greb et al.

(10) Patent No.: US 8,762,792 B2
(45) Date of Patent: Jun. 24, 2014

(54) EVENT MONITOR HAVING SWITCH MATRIX, SEPARATE COUNTER, AND COMPARE CIRCUITRY

(75) Inventors: Karl F. Greb, Missouri City, TX (US); Nicholas H. Schutt, Villeneuve-Loube (FR); Henry Duc Nguyen, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 745 days.

(21) Appl. No.: 12/983,877

(22) Filed: Jan. 3, 2011

(65) Prior Publication Data

US 2012/0173933 A1  Jul. 5, 2012

(51) Int. Cl.
*G06F 11/00* (2006.01)
(52) U.S. Cl.
USPC ............................................. 714/47.1

(58) Field of Classification Search
USPC ......................................... 714/47.1
See application file for complete search history.

(56) References Cited

U.S. PATENT DOCUMENTS

2002/0184568 A1* 12/2002 Kurrasch .................. 714/39

* cited by examiner

*Primary Examiner* — Scott Baderman
*Assistant Examiner* — Jigar Patel
(74) *Attorney, Agent, or Firm* — Lawrence J. Bassuk; Wade J. Brady, III; Frederick J. Telecky, Jr.

(57) ABSTRACT

An error monitor receives a first list of selected system events with each selected system event having an associated range. The occurrence of each selected system event is counted over a selected time period. An error indication is provided based on a comparison of each of the counts of the occurrence of each selected system event over the selected time period with the associated range. Operational profiles are used to store lists of selected system events with each selected system event having an associated range for each operational profile.

4 Claims, 4 Drawing Sheets

EVENT MONITOR HAVING SWITCH MATRIX, SEPARATE COUNTER, AND COMPARE CIRCUITRY

BACKGROUND

Safety regulations require that certain safety-related devices and systems be monitored to help ensure proper operation of the safety-related items. One source of errors for such equipment includes radiation-induced soft errors (SERs). SERs can occur at any time and thus continuous error monitoring has been used to try to detect such spurious errors in safety-related devices and systems. The continuous error monitoring typically includes using redundant logic and comparing the respective outputs of the redundant logic. However, using and comparing the results of redundant logic continuously is often more expensive than using unmonitored systems that do not provide redundancy by which to validate the results output by the system. Thus, the approach of using and comparing the results of redundant logic would entail unneeded additional costs for devices or systems for which relatively low-to-moderate levels of safety integrity are desired.

SUMMARY

The problems noted above are solved in large part by profiling system information and monitoring system execution in accordance with the profiled system information as disclosed herein. An error monitor receives a first list of selected system events with each selected system event having an associated range. The occurrence of each selected system event is counted over a selected time period. An error indication is provided based on a comparison of each of the counts of the occurrence of each selected system event over the selected time period with the associated range. Operational profiles are used to store lists of selected system events with each selected system event having an associated range for each operational profile.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . " Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

Figure 1:
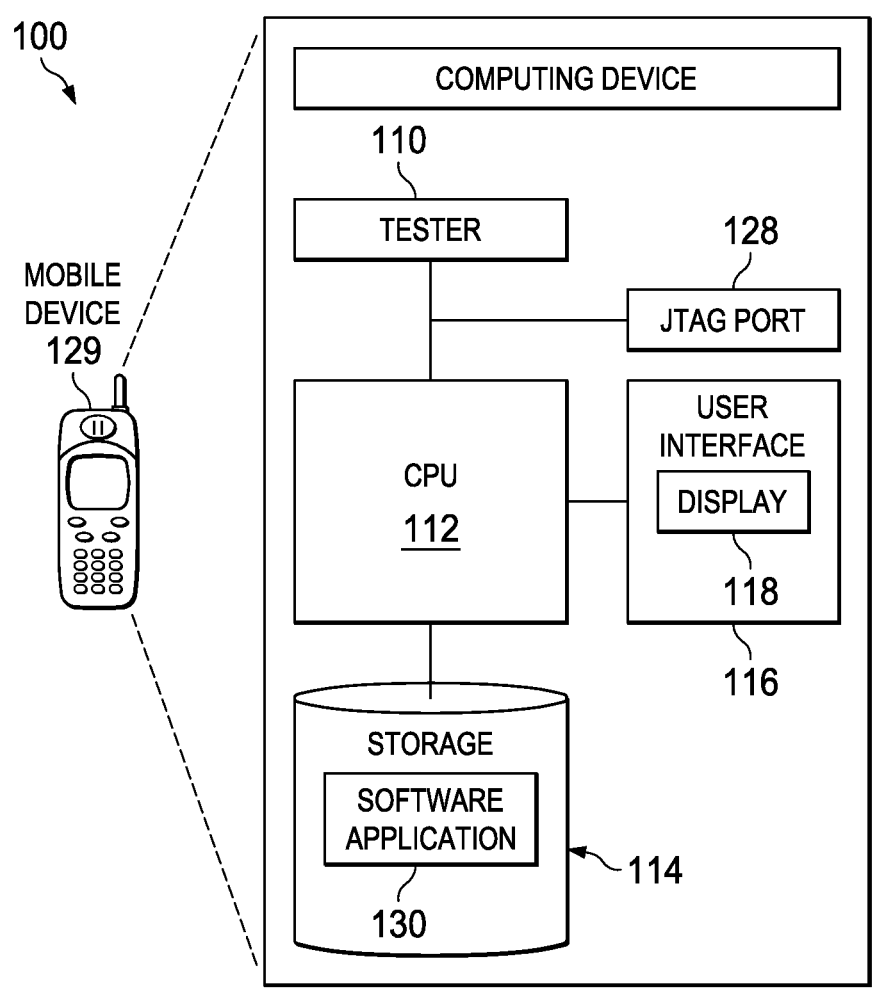
FIG. 1 shows an illustrative computing device 100 in accordance with embodiments of the disclosure.

FIG. 1 shows an illustrative computing device 100 in accordance with embodiments of the disclosure. For example, the computing device 100 is, or is incorporated into, a mobile communication device 129, such as a mobile phone, a personal digital assistant (e.g., a BLACKBERRY® device), a personal computer, automotive electronics, or any other type of electronic system.

In some embodiments, the computing device 100 comprises a megacell or a system-on-chip (SoC) which includes control logic such as a CPU 112 (which, for example, can be a CISC-type CPU, RISC-type CPU, or a digital signal processor (DSP)), a storage 114 (e.g., random access memory (RAM)) and tester 110. The storage 114 stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). In this way, the software application 130 can be debugged in an environment which resembles post-production operation.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio inputs (using, for example, voice recognition), and mechanical devices such as keypads, switches, proximity detectors, and the like. These and other input and output devices are selectively coupled to the computing device 100 by external devices using wireless or cabled connections.

Failures of electrical systems (such as in computing device 100) often result from numerous kinds of conditions and events, including SERs that can spontaneously occur. Disclosed herein are techniques (such as event counting techniques) for providing various levels of confidence that the resulting output of a system is valid. The disclosed techniques can be tailored to provide cost-effective solutions that provide low-to-moderate (and higher) levels of confidence in the results output by a device and/or system. The confidence of the monitoring can be increased (for example) by increased the number and types of events that are monitored (in accordance with a predicted operational profile). Optionally, a current set of events that is selected based on a previous state of events can be monitored.

Figure 2:
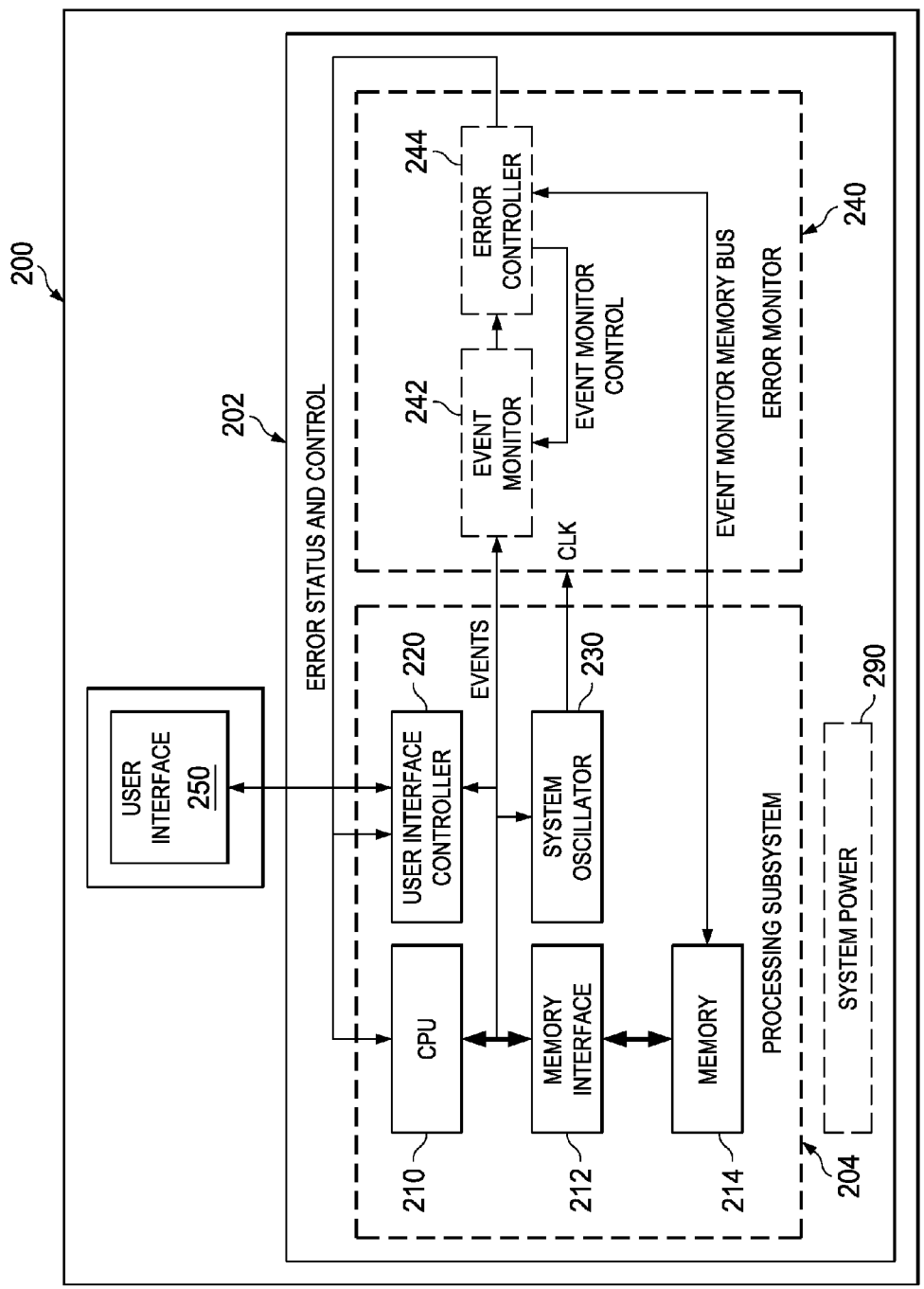
FIG. 2 is a schematic diagram illustrating a profile-based execution monitoring system in accordance with embodiments of the disclosure.

FIG. 2 is a schematic diagram illustrating a profile-based execution monitoring system in accordance with embodiments of the disclosure. Computing system 200 is illustrated as including a common substrate 202 upon which the illustrated elements of the computing system 200 are formed. Forming the illustrated elements of the computing system 200 on the common substrate 202 provides increased integration and reduces the number of connections for which drivers, bonding pads, and wiring would otherwise be used. In various embodiments, the included elements are implemented in separate circuit boards and packages (such as the user interface 250). System power 290 is used to power both the elements of substrate 202 and the user interface 250 (such as a dashboard indicator or a failure code reader interface), although the user interface 250 can be partially or completely powered by another power supply.

The processing subsystem 204 (which is also a processing system in its own right) of substrate 202 typically includes a CPU 210, a user interface controller 220, a system oscillator 230, an error monitor 240, and system power 290 (as described above). CPU 210 is a DSP, controller, microprocessor, or the like, and is used to control at least the processing subsystem 204. CPU 210 is typically coupled to a memory interface 212 that is arranged to control accesses to memory 214. The memory interface is additionally arranged to permit DMA ("direct memory accesses") of the memory 214 by subsystems such as the user interface controller 220 and error monitor 240 without intervention by the CPU 210. The memory 214 is arranged to store information used by CPU 210 and information used for control and operational parameters for the error monitor 240 as discussed below.

The user interface controller 220 is arranged to prepare commanded information for display and to generate video control signals used to control the user interface 250 so that the commanded information can be displayed. Likewise, the user interface controller 220 is arranged to receive commanded information from a user via the user interface 250 so that the commanded information can be input to the CPU 210. In various embodiments, the user interface controller 220 is arranged to perform DMA accesses of memory and/or receiving commanded information from the CPU 210.

The error monitor 240 monitors the event signals caused by the various elements of processing subsystem 204 (such as CPU 210). The error monitor 240 can, for example, output an error signal to be passed on to another microcontroller, activate an LED on the dashboard, and provided a signal to electrically disable the monitored system in the event of a severe error. The error monitor 240 is arranged to receive commands from the CPU 210 or is pre-programmed (e.g., using "flash" memory) to perform monitoring of specific events as described further herein.

In one example, the error monitor 240 is a "windowed watchdog" for counting selected multiple events and comparing the results against associated thresholds for the selected events during a window of time. In such an arrangement, the hardware requires little or no extra CPU or software to perform event monitoring and to provide a confidence status based on the event monitoring. In other embodiments, the CPU 210 can perform the programming of the error monitor registers, reading event counters, comparison of the ranges, and determining responses to event counts falling outside of a range specified by minimum and maximum values.

The error monitor 240 can receive commanded information by performing DMA accesses of memory and/or receiving such information from the CPU 210. The commanded information can include operational profiles, which list which system events are to be monitored. The memory accesses also can be used to perform and/or communicate the results of monitoring of the listed system events.

The error monitor 240 includes an event monitor 242 and an error controller 244. The event monitor 242 monitors selected events of the processing subsystem 204 such as DMA requests, interrupt requests, and processor-exported trace events. The frequency of the occurrence of the system events can be used to provide an indication that it is, for example, plausible that the system is operating correctly (and/or safely).

The measure of confidence in the provided indication can be increased or decreased based on the selection of which system events to monitor, the times in which to perform the monitoring, and the ranges to be used for comparison of the results. The error controller 244 selects and applies the thresholds for comparing various system event counts and selects which events are monitored using operational profiles. Different sets of thresholds, and the system events to which each threshold applies, can be specified using separate operational profiles.

Figure 3:
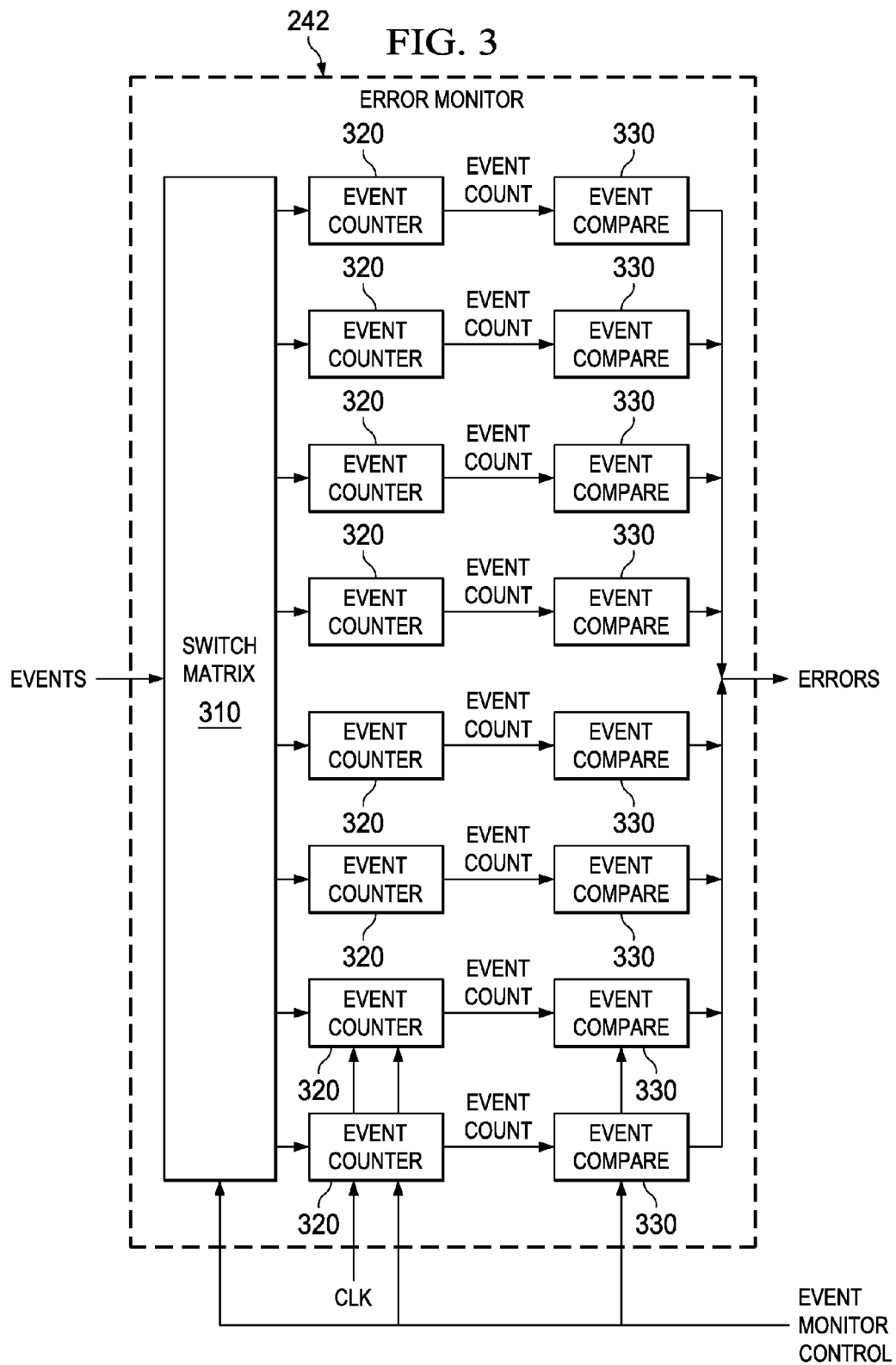
FIG. 3 is a block diagram illustrating an event monitor in accordance with embodiments of the disclosure.

FIG. 3 is a block diagram illustrating an event monitor in accordance with embodiments of the disclosure. The event monitor 242 (of error monitor 240) selects which events generated by the processing subsystem 204 to monitor, periodically counts the selected events, and compares the counted events against thresholds. The results of the comparisons are provided to the error controller 244 to determine what action(s) should be taken in response to the comparisons.

The switch matrix 310 is a selection circuit that is used to select which events generated by the processing subsystem 204 are monitored. The switch matrix 310 is programmed by the error controller 244 to selectively multiplex event signals to a respective event counter 320. The switch matrix 310 is programmed by the error controller via the "event monitor control" node to configure individual signal paths through the switch matrix 310 for each event signal received from the "events" node. In another embodiment, the CPU 210 can program the error controller to selectively multiplex event signals to a respective event counter 230. In yet other embodiments, the switch matrix can be "hard-wired" so that certain event signals are coupled to the event counter 320.

Each event counter 320 is arranged to receive an event signal that has been routed through the switch matrix 310. Each event counter 320 is programmed by the error controller via the "event monitor control" node to initialize a counter and to control when the event counter 320 is to start counting and to stop counting the received event signals. A selected system event can be used to control the start and/or the stop counting times. The selected system event for controlling the start and stop counting times can be selected in response to a selected operational profile. A clock signal ("clk") is used to synchronize reception times of the event signals at each of the event counters 320. The value of each event counter 320 is transmitted via an "event count" node to a respective event compare block 330.

Each event compare block 330 is arranged to receive the number of counted events (e.g., the value of each counter) from the respective event counter 320. Each event compare block 330 is programmed by the error controller via the "event monitor control" node to initialize minimum and/or maximum thresholds against which the received event value is compared. An event compare block 330 is now described using FIG. 4

Figure 4:
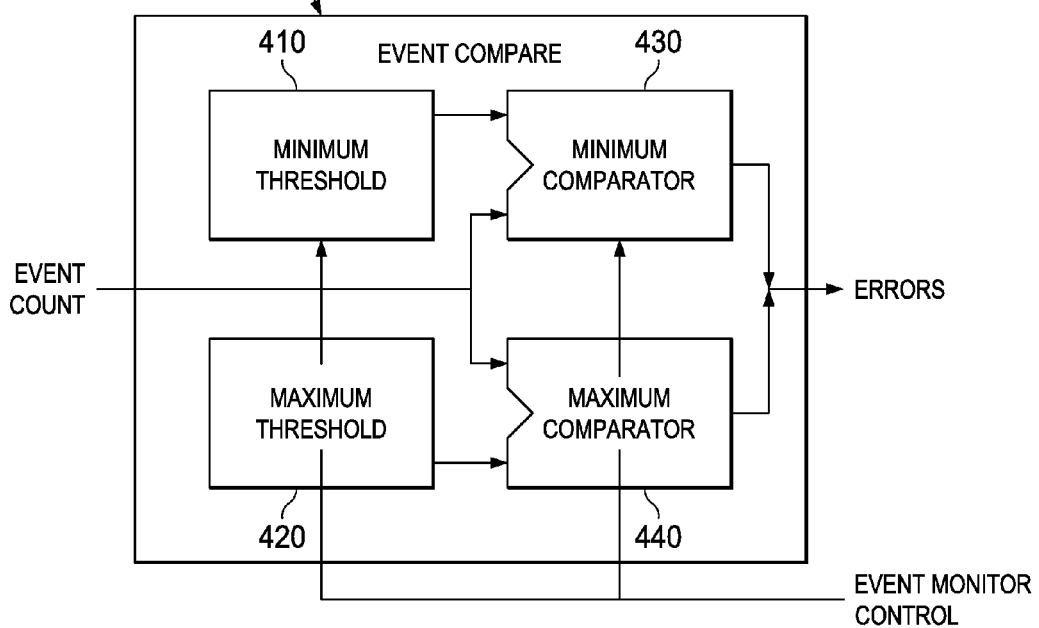
FIG. 4 is a block diagram illustrating an event compare block in accordance with embodiments of the disclosure.

FIG. 4 is a block diagram illustrating an event compare block in accordance with embodiments of the disclosure. Event compare block 330 includes a minimum threshold register 410, a maximum threshold register 420, a minimum comparator 430, and a maximum comparator 440. The minimum threshold register 410 is a register for storing a minimum value below which a received event count would likely indicate an error in the operation of processor subsystem 402. The maximum threshold register 420 is a register for storing the maximum value above which a received event count would likely indicate an error in the operation processor subsystem 402. The minimum threshold register 410 and the maximum threshold register 420 are initialized and controlled using the "event monitor control" signal.

The event compare block 330 uses the minimum comparator 430 to compare the received event count against of the value stored in minimum threshold register 410. In a similar fashion, the event compare block 330 uses the maximum comparator 440 to compare the receive event held against the value stored in a maximum threshold register 420. Accordingly, the event compare block 330 determines whether the received event count falls within a range having specified by the values stored in the minimum threshold register 410 and the maximum threshold register 420. The occurrence of a particular system event can be specified by using, for example, a minimum value (e.g., zero) for the maximum threshold against which the particular system event is compared. The thresholds are used as range endpoints (that can be inclusive or exclusive endpoints) and can include a minimum value (such as zero) and a maximum value (such as "all ones").

The event compare block 330 provides an error signal (at node "errors") that is coupled to the error controller 244. The error signal includes results of the comparisons, including (for example) whether the event account (for the specific event associated with the event count) falls within or falls outside the specified range. In various embodiments, the error signal also includes a value by which the received event account exceeds (or falls short of) a specified threshold. The error signal (at node "errors") is coupled to the error controller 244.

Figure 5:
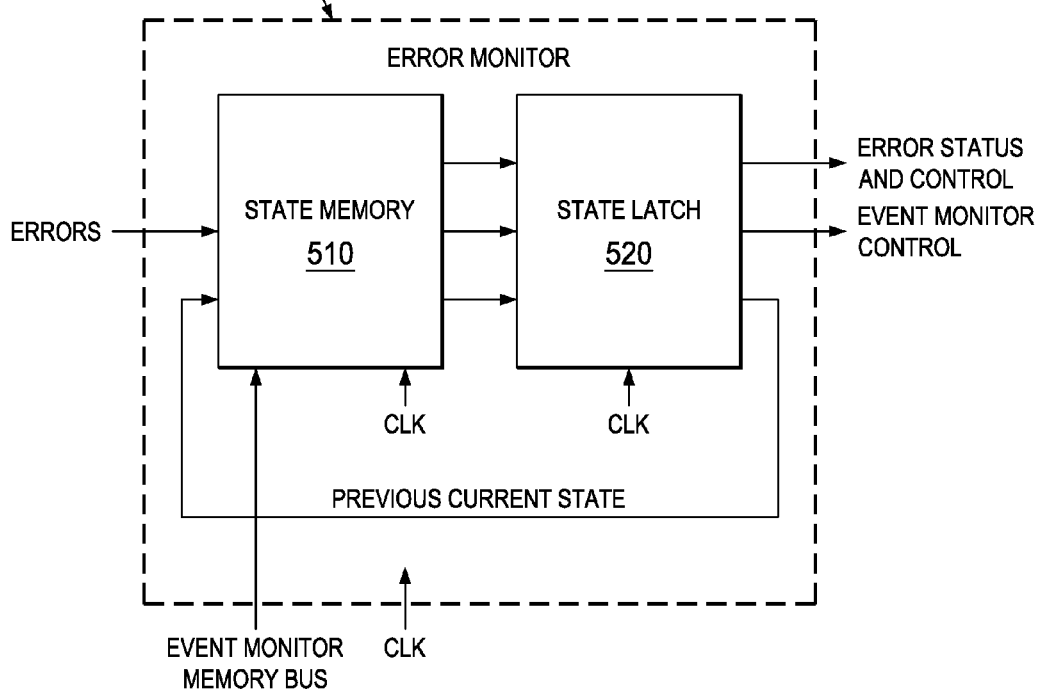
FIG. 5 is a block diagram illustrating an error controller in accordance with embodiments of the disclosure.

FIG. 5 is a block diagram illustrating an error controller in accordance with embodiments of the disclosure. The error controller 244 is arranged to control the event monitor 242 so that, for example, it can be easily determined whether it is plausible that the processing subsystem 204 is operating correctly. (As discussed above, a degree of plausibility can be determined by examining the amount of selected system events that occur over a time period.) In various embodiments, the error controller 244 is arranged to control the event monitor 242 with little or no intervention from the CPU 210. Thus, the event monitoring can occur with little or no intervention from the CPU 210. In the illustrated embodiment, the error controller 244 is arranged as a state machine and includes a state memory 510 and a state latch 520.

State memory 510 is arranged to receive programming instructions and data from memory 214 via an event monitor memory bus. The programming instructions and data contain information for defining (for example) thresholds for each operational profiles, intervals for providing start and stop times (over which monitoring is performed), state vectoring, and control signals for the error controller 244. The programming instructions can be modified in operation by a user via user interface 250. A clock signal is provided to synchronize transmission and reception of data to and from the state memory 510. The current state of state memory 510 is determined (at least in part) by a previous current state and an error signal that is received from the error monitor 242.

The current state information of state memory 510 is latched by state latch 520. The state latch 520 outputs are controlled by a clock error and include status and control signals, event monitor control signals, and previous current state information. The status and control signals are used to provide the results of the event monitoring performed by the error monitor 240 to the CPU 210, while the event monitor control signals are used to control the error monitor 242. The previous current state signal is used by the state memory 510 to vector the previous current state to a new current state.

Referring again to FIG. 2, the operation of the event monitor 240 is now described more fully. As discussed above, the error monitor 240 monitors system events (such as DMA requests, interrupt requests, and processor-exported trace events) that occur within processing subsystem 204. The error monitor 240 selects which events to monitor, counts the monitored events, provides the setting of independent minimum and maximum thresholds for the event counts, and provides a comparison of event counts against the independent thresholds. The comparison of the event counts is used (along with the state information of the error controller 244 to determine a confidence status that reflects a selected degree of confidence in the operation of the processing subsystem 204.

In operation, each selected event that occurs when the processing subsystem 204 is operating during a selected window of time is counted (using an event counter 320) and compared against thresholds. Thresholds (such as maximum and/or minimum thresholds) for each of the monitored events can be generated based by observing how many of the monitored events occur during a period of time on a system that is adjudged by a user to be operating correctly. A user (and/or a programmer) can use a touchpad of the user interface 250 during operation of the system to specify which events to observe, a start time and stop time between which to count the observed events, a tolerance factor for the observed counts (for providing values for the maximum and minimum thresholds), and a response to take in view of the observed counts falling outside of the range specified by the maximum and minimum thresholds.

The users and/or programmers can select (and/or modify) the thresholds (as well as which events to monitor) in order to obtain various degrees of confidence that it is plausible that the processing subsystem 204 is operating correctly. Thus, a level of confidence can be selected for any of several levels of safety-requirements that might be specified for a system, and the level of confidence can be dynamically adjusted during the operation of the system to meet the requirements of a particular operating profile.

An operating profile can be associated with a particular mode of operation of the processing subsystem 204 for which a confidence status is desired. An operating profile typically includes a profile name (such as an address and/or an index for the location of the event profile), a list of events to be monitored, a range delineated by a minimum and/or maximum threshold for each of the events to be monitored, and a list of actions to be taken when a monitored event exceeds a threshold.

The operating profile can be included in a list (including an ordered list) of various profiles in order to enhance the diagnostic ability and confidence level of the error controller 244 error output signal. For example, each profile stores a list of system events to monitor, a range for each system event to be monitored, and can specify one or more operating profiles to be used when the incidence of the monitored system events fall outside the associated range. The one or more operating profiles to be used, can be applied in sequence, or selected based upon the degree to which the incidence of the monitored system events falls outside the associated range.

As an example of an action that can be taken in response to a monitored event falling outside the associated range, the error monitor 240 can be reprogrammed in accordance with a second operational profile. The second operational profile typically contains different events to monitor and/or different ranges of expected counts, both of which are selected for operational verification of a specific operational mode of the system being monitored. Thus, the state memory 510 of the error monitor 240 is responsive to monitor events differently for each operating mode in a sequence of operating modes.

Operational profiles are used to monitor events in accordance with (e.g., differently for) each operating mode in a sequence of operating modes. For example, when a memory error occurs, different operational profiles are used. A first operational profile is used to program the error monitor 240 so that events of the processing system 204 in normal operation (e.g., a first operational mode) are periodically counted and counted to determine whether it is likely the processing system 204 is operating correctly.

When a sensor error is encountered during the start and stop times (such as when a sensor error event count exceeds a maximum threshold of zero), information associated with a second operational profile is used to reprogram the error monitor 240 such that events associated with the behavior of the sensor are more closely monitored (for example, system interrupts related to the sensor can be counted). If the sensor error does not occur again (or occurs only very infrequently such as at a rate at which another sensor error might be not encountered frequently enough to substantially disturb calculations related to the sensor), the error monitor 240 can provide a caution error signal that is logged but does not otherwise affect the operation of processing subsystem 204. If a sensor error occurs again (or repeatedly occurs again) within a period of time, the error monitor 240 typically provides an error signal such that corrective action can be taken (such as replacing the sensor or selecting another sensor) and/or shutting down the processing subsystem 204.

As an example of an action that can be taken when a monitored event exceeds (or falls below) a threshold, the error monitor 240 can generate an error signal (such as a system interrupt). The error signal typically includes a vector that specifies a response to be taken in view of the detected error. A vector can be supplied for each range, and the supplied vector can differ based on the degree to which the counted system event indications fall outside of a range. When the processing subsystem 204 receives the error signal, the processing subsystem 204 typically records the type of detected error to memory, resets some or all elements of the processing subsystem 204, and/or shuts down in accordance with a selected level of confidence in the soundness in the operation of processing subsystem 204. The user can select a level of confidence in the soundness in the operation of the processing subsystem 204 based upon the criticality of the intended application of the processing subsystem 204.

The selected level of confidence in the soundness in the operation of processing subsystem 204 can be selected by a user (and/or programmer) in view of the severity of the potential negative consequences of incorrect operation of processing subsystem 204. Accordingly, the selected level of confidence in the soundness in the operation of the processing subsystem 204 can also be selected in view of the plausibility that the processing subsystem 204 is operating correctly.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. An error monitor comprising:
    a) a clock lead;
    b) event monitor control leads;
    c) switch matrix circuitry having event inputs, event monitor control inputs connected to the event monitor control leads, and separate event signal outputs;
    d) first event counter circuitry having an input connected to a first event signal output, event monitor control inputs connected to the event monitor control leads, a clock input connected to the clock lead, and a first event count output;
    e) first event compare circuitry having an input connected to the first event count output, event monitor control inputs connected to the event monitor control leads, and a first error output;
    f) second event counter circuitry having an input connected to a second event signal output, event monitor control inputs connected to the event monitor control leads, a clock input connected to the clock lead, and a second event count output; and
    g) second event compare circuitry having an input connected to the second event count output, event monitor control inputs connected to the event monitor control leads, and a second error output.

2. The error monitor of claim 1 in which the second event counter circuitry is separate from the first event counter circuitry.

3. The error monitor of claim 1 in which the second event counter circuitry is separate from the first event counter circuitry, and the second event compare circuitry is separate from the first event compare circuitry.

4. The error monitor of claim 1 in which the first and second event counter circuitries each include:
    h) maximum threshold and minimum threshold registers having inputs coupled to the event monitor control leads and having threshold outputs, and comparator circuitry having inputs coupled to the threshold outputs, an input coupled to the event count output, and an error output.

* * * * *